W. NICHOLS & C. V. UZZELL.
ELECTRIC COOKER.
APPLICATION FILED FEB. 19, 1912.
1,049,517.
Patented Jan. 7, 1913.
3 SHEETS—SHEET 1.
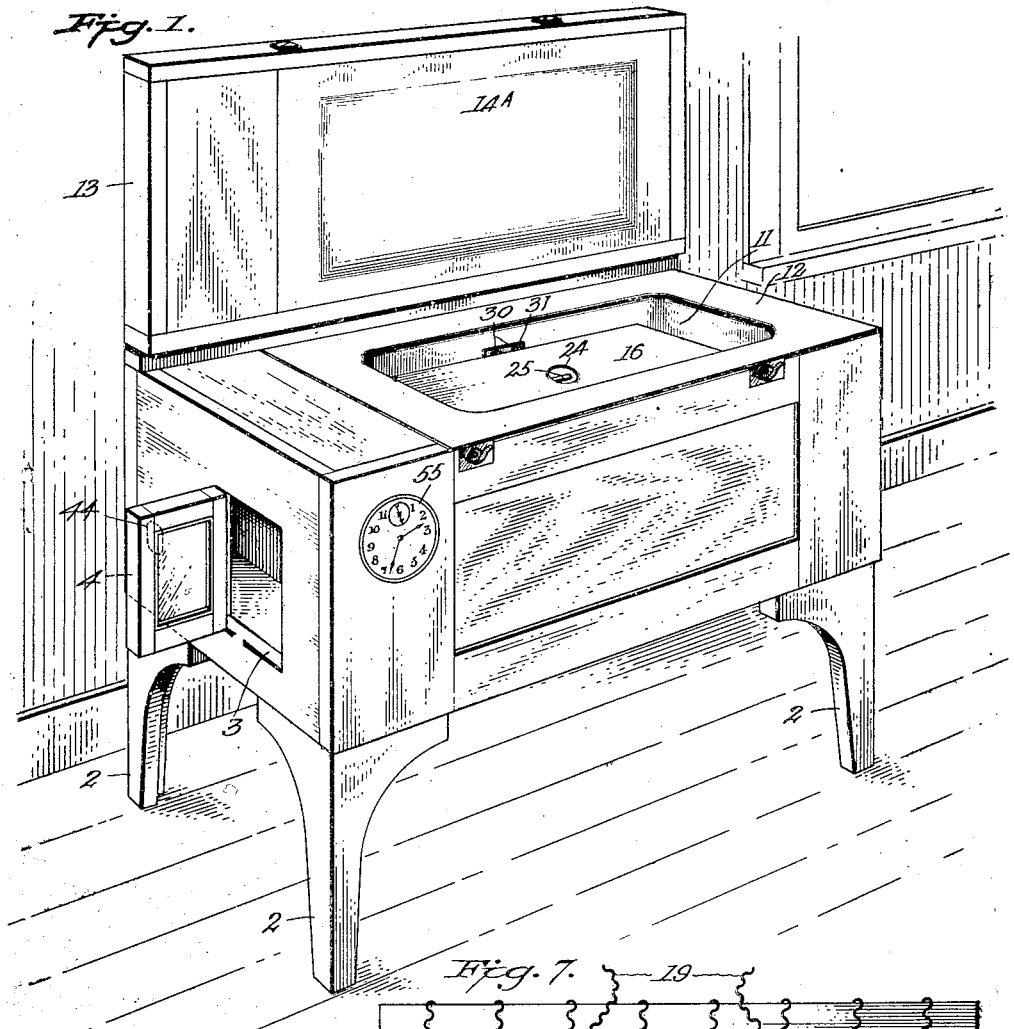
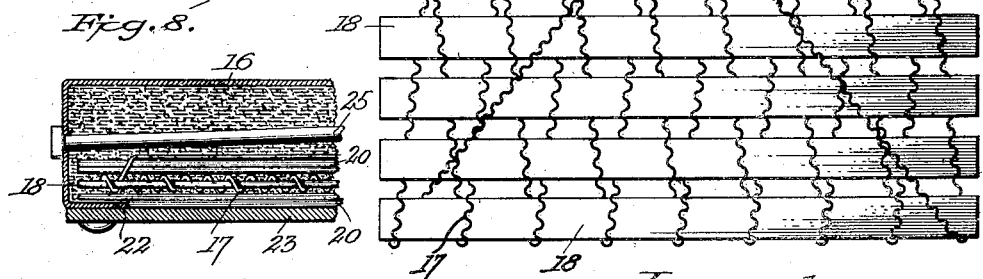

W. NICHOLS & C. V. UZZELL.
ELECTRIC COOKER.
APPLICATION FILED FEB. 19, 1912.

1,049,517.

Patented Jan. 7, 1913.

3 SHEETS—SHEET 2.

Witnesses:
G. Sargent Elliott
William T. Uzzell

By H. S. Bailey

Inventors:
Will Nichols,
Charles V. Uzzell.
Attorney.

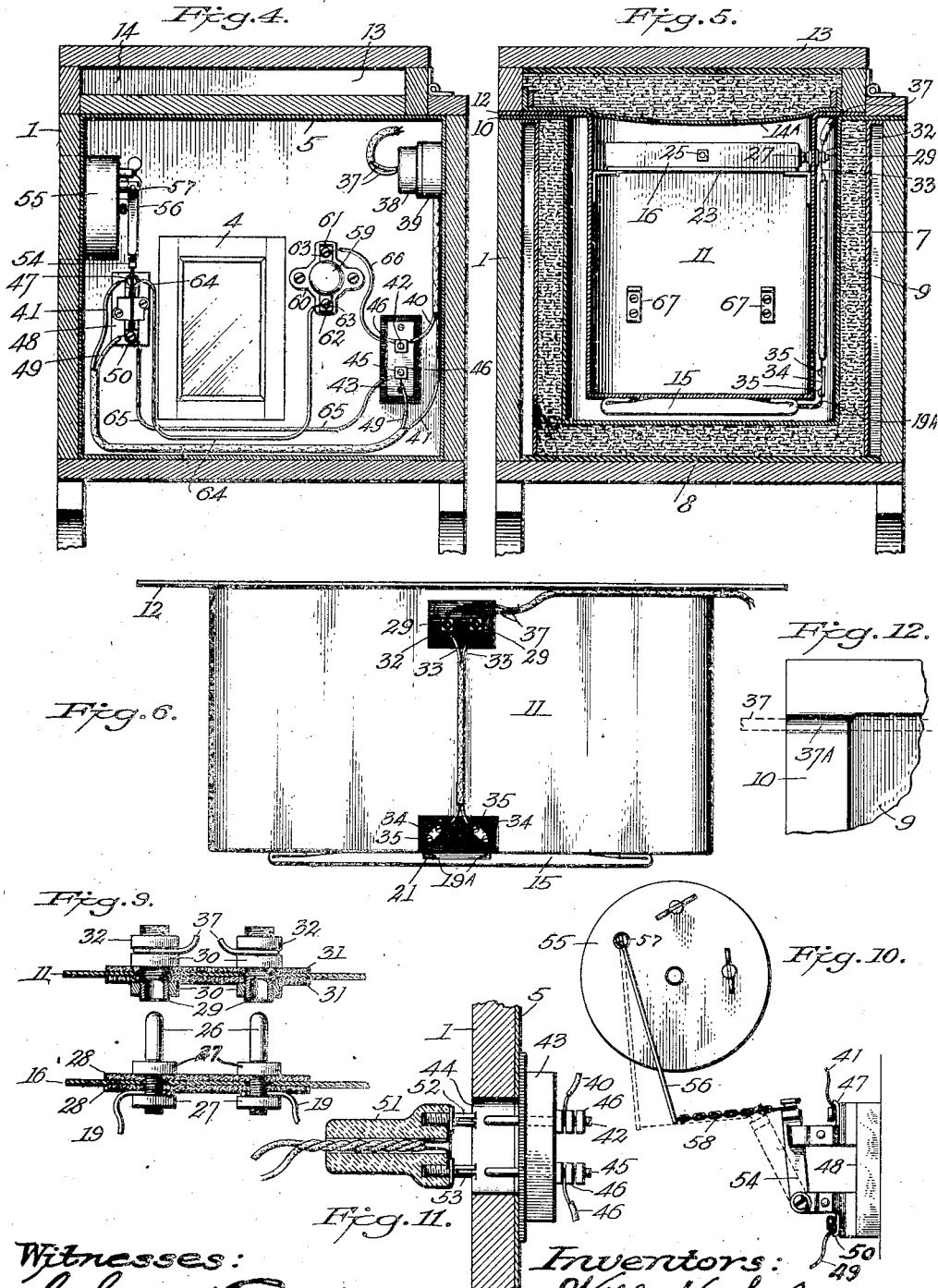

UNITED STATES PATENT OFFICE.

WILL NICHOLS AND CHARLES V. UZZELL, OF DENVER, COLORADO.

ELECTRIC COOKER.

1,049,517.         Specification of Letters Patent.         Patented Jan. 7, 1913.

Application filed February 19, 1912. Serial No. 678,433.

*To all whom it may concern:*

Be it known that we, WILL NICHOLS and CHARLES V. UZZELL, citizens of the United States of America, residing in the city and county of Denver and State of Colorado, have invented a new and useful Electric Cooker, of which the following is a specification.

This invention relates to improvements in electric cookers.

Figure 2:
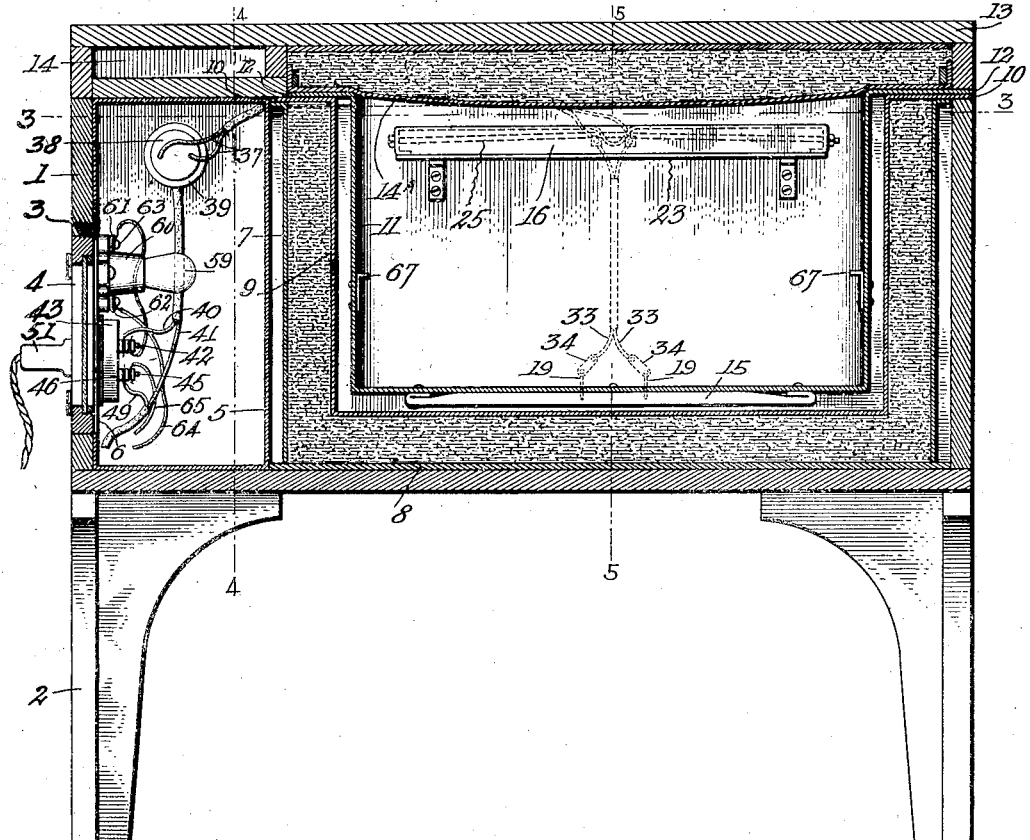
Figure 3:
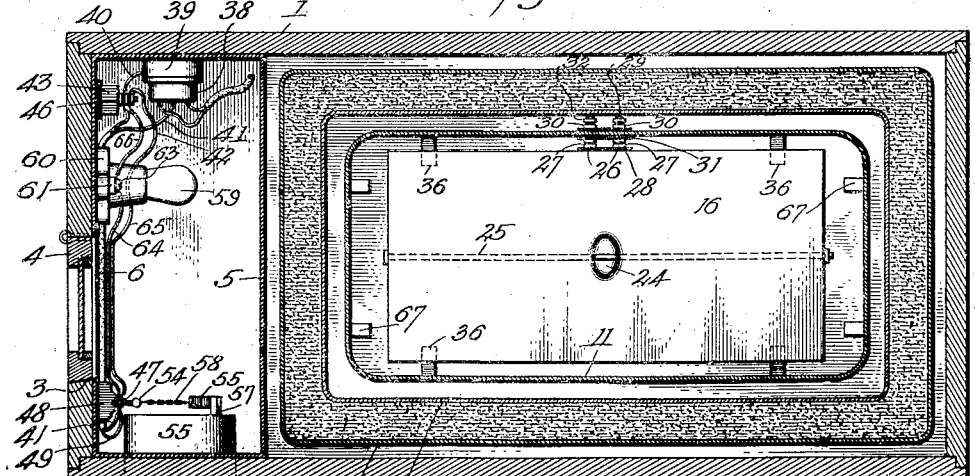

The object of the invention is to provide a cooker comprising a cabinet having a hinged cover, and a removable oven suspended in said cabinet, and surrounded by a body of suitable non-conducting material, such as ground mica, which also retards the conduction and radiation of heat; a dead air space being interposed between the sides and bottom of the oven, and the non-conducting body, and between the non-conducting body and the cabinet, the lid being hollow, and filled with a similar non-conducting material which is held in place by a metal bottom, heating units being provided, one of which is positioned in the top of the oven, and another beneath the same, said units being arranged to be connected with a current supply. Further, to provide a cooker of this character having heating units which are arranged to be connected with a current supply and with a switch, and a time trip mechanism connected with the lever of said switch, whereby the said lever is thrown at a predetermined time, and the circuit through the units opened. These objects are accomplished by the character of cooker illustrated in the accompanying drawings, in which:

Figure 1, is a perspective view of the improved electric cooker, the lid thereof being raised. Fig. 2, is a vertical, longitudinal sectional view through the same, the heating units being shown in side elevation. Fig. 3, is a horizontal sectional view on the line 3—3 of Fig. 2. Fig. 4, is a transverse sectional view on the line 4—4 of Fig. 2. Fig. 5 is a similar view on the line 5—5 of Fig. 2. Fig. 6, is a side view of the oven, showing the arrangement of wiring for connecting the upper and lower heating units, and the conductor leading from the terminals of the upper unit. Fig. 7, is a plan view showing a plurality of strips of mica interwoven with crimped wire, which comprises the heating unit. Fig. 8, is a sectional view of a fragment of the upper unit. Fig. 9, is a fragmental sectional view illustrating the terminal plugs or pins of the upper unit, and the contact sleeves which are attached to the side of the oven, and in which the said plugs are adapted to be inserted. Fig. 10, is a view showing the switch and the automatic trip mechanism connected with the lever of said switch for throwing the same to open an electric circuit through the heat units. Fig. 11, is a sectional view through a portion of the end of the cabinet, showing the electrode for closing the circuit through the heating units. And Fig. 12, is a plan view of a portion of the casing which surrounds the oven, showing a groove therein to accommodate the conductor wires.

Referring to the accompanying drawings, the numeral 1, indicates a cabinet of suitable dimensions, which is preferably made of wood and is supported upon legs 2. One end of the cabinet is provided with an opening 3, which is normally closed by a hinged door 4. A sheet metal casing 5 is secured in this end of the cabinet, and is provided with an opening 6, which registers with the opening 3 in the cabinet. This casing is of the same depth as the cabinet, and fits snugly therein, but its width is approximately one-fifth of the length of the cabinet. The purpose of this casing will be fully explained hereinafter.

In the space between the casing 5, and the opposite end of the cabinet, is placed a rectangular sheet metal casing 7, which is open at the bottom and rests upon a sheet of asbestos 8, which is laid upon the bottom of the cabinet. This casing 7 is of less length and width than the interior of the cabinet, so that when it is placed therein, a dead air space of about one-half of an inch is left between it and the walls of the cabinet.

A rectangular casing 9 is placed within the casing 7, and this latter casing is provided with a bottom, and is of such dimensions relatively to the casing 7, that a clear space of approximately one and a half inches is left between the two casings and between the bottom of the casing 9 and the bottom of the cabinet.

The casings 7 and 9, are secured together in any suitable manner, and the upper edge of one of them—preferably the inner casing—is flanged, as shown at 10, and the flange 10 rests upon and is secured to the upper edge of the cabinet. The space between the casings 7 and 9 is filled preferably with ground mica, which is not only a non-conductor of electricity, but also serves to retard the conduction and radiation of heat, although any other suitable material combining these properties may be employed.

Within the casing 9, is suspended the oven 11, which is of slightly less length and width than the casing 9, so that a dead air space of about one-half inch is left all around them and between their bottoms. This oven is removable, and its upper end terminates in a flange 12, which rests upon the flange of the casing 9.

A hollow lid 13, is hinged to the cabinet, and the part of this lid directly above the casing 5, is inclosed to form a dead air space 14, while the remaining portion of the lid is provided with a filling of ground mica, which is held in place by a sheet metal plate 14$^A$, which forms the bottom of the lid. This plate 14$^A$ is given an outward bulge, as shown, so that when the lid is closed down upon the cabinet, the bulged portion of the plate 14$^A$ extends slightly into the top of the oven and seals the same, so as to prevent the escape of heat, as well as of odors, during the cooking period.

Two heaters are employed in connection with the improved cooker, one being supported in the top of the oven, while the other is secured to the bottom of the oven, in the dead air space, between the oven and the casing 9. The lower heater, or heating unit, is inclosed within a tin casing 15, and the upper unit is also inclosed in a tin casing 16, but one which is designed to be employed as a griddle when desired, as will be set forth hereinafter. Each unit is made up of a piece of crimped wire 17, of sufficient length to give the required resistance, the crimped wire affording a far greater resistance area, in proportion to a given length, than the same length of straight wire would afford. In order to properly dispose the wire in forming a unit so that there may be no short circuiting, a plurality of mica strips 18 are employed, which are spaced at equal distances apart, edgewise, and the wire is interwoven back and forth between these strips, in the manner shown in Fig. 7, so that one lap will not contact with another, the ends of the wire being disposed as shown, to provide terminals 19. Upon each side of the unit thus formed, is laid one or more layers of sheet mica 20, care being taken to insulate the terminal end portions of the wire from the loops of wire which extend between the mica strips, in order to avoid short circuiting.

In the case of the lower unit, the woven wire and mica strips, with the layers of sheet mica on opposite sides, are placed upon a sheet of tin and covered by a second sheet of tin, and the edges of the bottom sheet are folded over the top sheet so as to inclose the unit, as shown in Figs. 2, 5 and 6; the casing 15 thus formed, being secured to the bottom of the oven with the terminals 19 extending through an aperture 21 in the casing 15, as shown by Fig. 6. The upper unit is made in the same manner, but its casing 16 is arranged as follows: This casing 16 is rectangular in form, and approximately an inch deep, and it is of less length and width than the length and width of the oven. The edge of the casing is inturned to form a flange 22, to which is secured a metal plate 23, the outer face of which is polished, and this plate forms the bottom of the casing when the two units are employed in baking, but by removing the upper unit and reversing its position, it may alone be connected with the electric source and used as a griddle.

A recess or depression 24 is formed centrally in the top of the casing, and a headed rod 25 is passed through the ends of the casing and through the sides of the depression 24, as shown by Figs. 1, 2, and 3, the part of the rod passing through the depression affording an engaging means for a suitable lifter, not shown, when the unit is placed within or removed from the oven. A pair of spaced pins 26 extend through one side of the casing 16, and are clamped thereto by nuts 27, through which the threaded ends of the pins pass, and which are screwed against the opposite faces of the side of the casing, as shown by Fig. 9, strips 28 of insulating material being interposed between the nuts and the side of the casing. These pins 26 act as binding posts for the terminals 19 of the unit, which are connected thereto by the inner pair of nuts 27. Before securing the plate 23 to the casing 16, the said casing is partially filled with ground mica, as shown by Fig. 8, and the unit is then placed in the casing, upon the mica, and its terminals secured to the pins 26 as before stated, and the plate 23 is then secured to the casing. The ground mica filling, retards the upward radiation of the heat generated by the unit, and therefore tends to deflect it toward the bottom of the oven.

Through apertures in the rear wall of the oven, adjacent to its upper or flanged end, are secured threaded sleeves 29, by clamping nuts 30, which are screwed upon the sleeve and against the opposite sides of the oven wall, insulating strips 31 being interposed between the nuts and the oven wall. The sleeves 29 extend beyond the outer clamping nuts 30, to receive binding nuts 32, which secure the upper ends of conductor wires 33, the lower ends of which are connected to the terminals 19$^A$ of the lower unit, the connection being preferably made by means of small plates 34 through which binding screws 35 are passed.

The sleeves 29 register with the pins 26 which are inserted in the said sleeves when the unit is in position in the oven. The unit is further supported upon brackets 36, which are secured to the walls of the oven. The connections between the units and the conductor wires 33 are suitably insulated to prevent contact of the wires with the oven wall or with the surrounding casing 9. The pins 26 and sleeves 29 form contact elements, as will be understood.

From the contact sleeves 29 conductor wires 37 extend into the casing 5, at one end of the cabinet, and their terminal ends are connected to contacts in the cap 38 of a block 39, which is of a style in common use, and is therefore not illustrated in detail, the contacts of the cap engaging frictionally with the contacts of the block, in the usual manner. The conductor wires 37 extend through the dead air space between the oven and the surrounding casing 9, and a groove 37A is pressed into the flange of the said casing 9, as shown in Fig. 12, so that the wires 37 may extend through the said groove, between the flange of the oven and the flange of the casing 9, into the casing 5.

From the block 39 extend conductor wires 40 and 41, the terminal end of the wire 40 being connected to a contact pin 42, the opposite end of which extends through a non-conducting block 43 secured to the wall of the casing, and into an aperture 44 in the end wall of the cabinet. A similar contact pin 45 also passes through the block 43, a short distance below the pin 42, and into the aperture 44 in the end of the cabinet, each of the pins being provided with three binding nuts 46, as shown.

The terminal end of the wire 41 is connected to one pole 47 of an ordinary knife switch 48, which is secured to the side of the casing 5, at the opposite end thereof from the block 43. A wire 49 extends from the opposite pole 50 of the switch, to the contact pin 45 in the block 43. A switch plug 51, having frictional contacts 52 and 53, is inserted in the aperture 44 in the end of the cabinet, the contacts 52 and 53 engaging the pins 42 and 45 respectively, thus closing a circuit through the switch 48 and heating units, the contacts of the switch plug being connected by wires with a current supply, as will be understood. When a circuit is closed through the switch and heating units, by the insertion of the switch plug 51, as above described, heat is generated by the units, and is retained in the oven by the surrounding insulating material, which prevents its escape either by radiation or conduction. It will thus be seen that in a relatively short time sufficient heat will be generated by the units to raise the temperature in the oven to the required degree for cooking, and that this temperature will be maintained for a relatively long period by the insulating material surrounding the oven. It is therefore unnecessary that the current should be employed for a longer period than is necessary to thoroughly heat the oven, and an automatically operating trip device is employed to throw the switch arm 54, and cut off the current supply at a predetermined time.

The device for throwing the switch arm, comprises an ordinary alarm clock 55, which is supported in a circular aperture in the front of the cabinet, and in the casing 5, and a lever 56, one end of which is rigidly secured to the stem 57 of the alarm winding mechanism, while its opposite end is connected by a chain 58, or other suitable flexible connection, with the switch arm 54. The spring of the alarm mechanism is tightly wound, prior to the placing of the clock in the cabinet, and the usual indicator hand is turned to indicate the hour when it is desired to cut off the current. At the required time the usual mechanism acts to release the spring, the winding stem 57 of which is thereby turned, carrying with it the lever 56, which draws on the chain 58, and withdraws the switch arm 54 from engagement with its contact, whereby the circuit through the units is broken, as will be understood by reference to Fig. 10. The stem 57 makes only a partial rotation each time the switch arm is thrown, and the operating spring is only partially unwound, and is therefore re-wound when the switch arm is rocked to again bring it into engagement with its contact. By automatically cutting off the current supply as above described, the over-heating of the oven, and consequently over-cooking of the articles placed therein is prevented; the attendant is thus relieved of responsibility, and a great saving in the cost of current supply is effected.

In order to ascertain whether the current is on or off, after the switch plug 48 has been inserted, an indicator in the form of an incandescent lamp 59 is employed, which is screwed into a common form of socket 60, which is attached to the side of the casing 5. The socket is provided with the usual contacts 61 and 62, which are provided with binding screws 63. A wire 64 connects the pole 47 of the switch with the contact 62 of the lamp socket; a wire 65 connects the switch pole 50 with the post or pin 45, and a wire 66 connects the pin 42 with the contact 61 of the lamp socket, thus bringing the lamp in circuit with the heating units and with the switch. If the current is on the fact will be indicated by the lamp, and at the same time, if the current should be off, the fact will be made known by the failure of the lamp to give light. The lamp may be inspected through the door 4, which is provided with a glass panel as shown, and the door also permits the attendant to insert his hand to wind the clock and set the alarm indicator or to replace the lamp when required.

The oven is provided at its ends with brackets 67, upon which any suitable rack may be placed for the support of pans, containing articles of food to be cooked, while beef or fowl to be roasted would be placed in a pan at the bottom of the oven. For frying cakes or other articles, the upper unit is removed and reversed so as to bring the plate which forms the griddle uppermost; then by connecting the plug 51 with the terminal pins 26, a circuit through the unit is closed, and heat thereby generated.

In operation, the plug 51 is inserted to engage the contact pins 42 and 45, the indicator on the clock having been previously turned to indicate the time when the current is to be cut off. The oven is then allowed to heat, and when well heated the articles to be cooked are placed therein, and the oven closed and tightly secured, to prevent the escape of the heat, and also of the steam, and odors arising from the cooking food. At the required time, the current is automatically cut off, as before described, and the contents of the oven are thereafter cooked until done by the heat stored in the cooker, and burning or scorching of the food is thus prevented.

Having described our invention, what we claim as new and desire to secure by Letters Patent, is:

1. An electric cooker, comprising a cabinet, a double drum casing within said cabinet provided with a space between its two drums, said double drum casing being of enough smaller size than said cabinet to form an air space between its outside drum and said cabinet, a baking oven within said cabinet and within said double drum casing, and of enough smaller size to form an air space between it and the inner drum of said double drum casing, a heat unit in the upper part of said oven, a second heat unit below said oven, a heat retaining element underneath the heat unit that is below said oven, said heat units being operatively connected to an electric current, a body of heat confining, retaining, and non-conductive material between the inner and outer drums of said double drum casing, an opening into said oven, a cover on said cabinet opening into the opening of said oven, and a heat retaining element in said cover arranged to fit against the opening of said oven, and means for removably securing the upper heat unit in the top portion of said oven.

2. In an electrical cooker, the combination of a cabinet, an oven in said cabinet, and a cover on said cabinet opening into said oven, a heat retaining medium in said cabinet surrounding said oven and arranged in such relative relation to said oven and said cabinet as to form an air space between its inner side and said oven and between its outer side and said cabinet, an electric current operated heat unit detachably connected and supported within the top portion of said oven, a similar heat unit connected to the under side of the bottom of said oven, means including circuit wires for connecting said heat units to operate in unison to heat said oven from opposite parts of it, the arrangement of said heat units and of said heat retaining medium being such that the heat from the lower unit is reflected upwardly through the bottom of the oven, and the heat of the upper heat unit is reflected downward and mingles with the heat of the lower unit whereby an even heat permeates all parts of said oven.

3. In an electric cooker, a cabinet; a bottomless outer casing therein; a casing within the outer casing having a bottom, and spaced from the outer casing and bottom of the cabinet; a heat resisting filling in the space between said casings; an oven supported within the inner casing; a dead air space being left between the oven and inner casing and between the outer casing and the cabinet; a heating unit in the top of the oven; a heating unit in the space beneath the oven; circuit wires connecting said units with terminal contact pins on the cabinet; a portable electrode for engaging said pins to close a circuit through the heating units; and a heat resisting lid for closing the cabinet and oven.

4. In an electric cooker, a cabinet; a bottomless outer metal casing therein, which rests upon the floor of the cabinet; a metal casing within the outer casing having a bottom, and spaced from the outer casing and bottom of the cabinet; a heat resisting filling in the space between the casings; an oven supported within the inner casing, a dead air space being left between the oven and the inner casing and between the outer casing and the cabinet; a portable heating unit in the top of the oven; a heating unit secured to the bottom of the oven in the space beneath the same; contact terminals on the cabinet; wires connecting the units and contact terminals; a portable electrode for engaging the terminal contacts to close a circuit through the units; and a heat resisting lid for closing the cabinet.

5. In an electric cooker, a cabinet; an inner and outer casing in the cabinet spaced from each other all around; and a filling of ground mica in the space between said casings; a removable oven in the inner casing; a heating element in the top of and below the oven; contact pins in the cabinet;

circuit wires connecting said heating elements and the contact pins; and an electrode for engaging the contact pins to close a circuit through the heating elements; and a lid for said cabinet having a mica filling.

6. In an electric cooker, a heater, comprising crimped wire interwoven with strips of mica, the ends of said wire being disposed as terminals; mica sheets on opposite sides of the heater; a casing for the heater; and contacts on the casing connected with the heater terminals, whereby connection may be made with a current supply.

7. In an electric cooker, an oven having contacts adapted to be connected with a current supply; a removable casing in the oven having contacts adapted to engage the oven contacts; a heater in said casing comprising crimped wire interwoven back and forth with strips of mica, the terminals of said wire being connected with the contacts of the casing; and heat resisting elements on opposite sides of the heater.

8. In an electric cooker, a heater comprising crimped wire interwoven with strips of mica, the ends of said wire being disposed to form terminals; a casing for the heater, one side of which is in the form of a griddle; heat resisting media in the casing on opposite sides of the heater; and contacts on said casing connected with the terminals of the heater, whereby connection may be made with a current supply.

9. In an electric cooker, the combination with a cabinet having two compartments, of a casing in one compartment, and spaced therefrom; an inner casing spaced from the first casing; and a heat resisting medium in the space between the two casings; a removable oven in the inner casing and spaced therefrom; heating elements in the top of and below the oven in circuit with a current supply; a door in the other compartment and a heat resisting lid for the cabinet.

10. In an electric cooker, a heating element having terminals; a casing therefor, having contacts connected with the terminals, said casing having a depression formed in its upper side; and a rod extending through the casing, and through the opposite sides of the depression, the portion of the rod lying within the depression being adapted to receive a lifting implement.

11. In an electric cooker, a cabinet comprising two compartments separated by a heat resisting partition, contacts in one compartment adapted to be connected with a current supply, heating units in the other compartment, and wires connecting said units and extending to the contacts in the first compartment, a door in the first compartment, and a heat resisting lid for said cabinet.

In testimony whereof we affix our signatures in presence of two witnesses.

WILL NICHOLS.
CHARLES V. UZZELL.

Witnesses:
G. SARGENT ELLIOTT,
ADELLA M. FOWLE.